US011548522B2

(12) United States Patent
Szczerba et al.

(10) Patent No.: US 11,548,522 B2
(45) Date of Patent: Jan. 10, 2023

(54) SPEED DIFFERENCE INDICATOR ON HEAD UP DISPLAY

(71) Applicant: GM GLOBAL TECHNOLOGY OPERATIONS LLC, Detroit, MI (US)

(72) Inventors: Joseph F. Szczerba, Grand Blanc, MI (US); Omer Tsimhoni, Bloomfield Hills, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/169,658

(22) Filed: Feb. 8, 2021

(65) Prior Publication Data

US 2022/0250543 A1 Aug. 11, 2022

(51) Int. Cl.
*B60R 1/00* (2022.01)
*B60W 50/14* (2020.01)
*B60W 30/14* (2006.01)

(52) U.S. Cl.
CPC ............. *B60W 50/14* (2013.01); *B60R 1/001* (2013.01); *B60W 30/143* (2013.01); *B60R 2300/205* (2013.01); *B60R 2300/302* (2013.01); *B60W 2050/146* (2013.01)

(58) Field of Classification Search
CPC .............. B60R 1/001; B60R 2300/205; B60R 2300/302; B60W 30/143; B60W 50/14; B60W 2050/146
See application file for complete search history.

(56) References Cited

U.S. PATENT DOCUMENTS

| | | | | |
|---|---|---|---|---|
| 8,500,971 B2* | 8/2013 | Le Gallo | ................... | C25B 9/73 |
| | | | | 205/628 |
| 9,994,234 B2* | 6/2018 | Oguri | ..................... | B60K 35/00 |
| 10,151,595 B2* | 12/2018 | Huber | ................... | G07C 5/0825 |
| 2006/0290202 A1* | 12/2006 | Shibata | ...................... | B60T 7/22 |
| | | | | 303/165 |
| 2008/0096623 A1* | 4/2008 | Fujii | ....................... | A63F 13/52 |
| | | | | 463/6 |
| 2012/0212353 A1* | 8/2012 | Fung | ...................... | B60W 10/20 |
| | | | | 701/1 |
| 2013/0110316 A1* | 5/2013 | Ogawa | ............. | G08G 1/096725 |
| | | | | 701/1 |
| 2014/0176350 A1* | 6/2014 | Niehsen | .................. | G06V 20/58 |
| | | | | 340/988 |
| 2014/0180538 A1* | 6/2014 | Mineo | ..................... | G01D 7/002 |
| | | | | 701/36 |
| 2014/0182508 A1* | 7/2014 | Oishi | ......................... | G01P 1/11 |
| | | | | 116/62.3 |
| 2014/0225721 A1* | 8/2014 | Simon | .................... | B60K 37/02 |
| | | | | 340/436 |
| 2015/0109756 A1* | 4/2015 | Choi | ....................... | G01D 7/005 |
| | | | | 362/23.01 |

(Continued)

*Primary Examiner* — Christopher E Leiby

(57) ABSTRACT

A head up display (HUD) system includes: a difference module configured to determine a speed difference based on a difference between (a) a present speed of a vehicle and (b) a target speed of the vehicle; a light source configured to, via a windshield of the vehicle, generate a virtual display that is visible within a passenger cabin of the vehicle; and a display control module configured to control the light source to include a visual indicator of the speed difference in the virtual display.

17 Claims, 9 Drawing Sheets

(56) References Cited

U.S. PATENT DOCUMENTS

| | | | | |
|---|---|---|---|---|
| 2015/0175068 | A1* | 6/2015 | Szostak | B60K 35/00 |
| | | | | 340/435 |
| 2015/0343951 | A1* | 12/2015 | Kim | G07C 5/02 |
| | | | | 701/42 |
| 2017/0154554 | A1* | 6/2017 | Tanaka | G02B 27/0101 |
| 2017/0232983 | A1* | 8/2017 | Miglianico | B61L 3/008 |
| | | | | 701/19 |
| 2018/0023970 | A1* | 1/2018 | Iguchi | G08G 1/096861 |
| | | | | 345/7 |
| 2018/0222478 | A1* | 8/2018 | Limbacher | B60W 50/0097 |
| 2018/0253612 | A1* | 9/2018 | Koyama | G08G 1/096725 |
| 2020/0380257 | A1* | 12/2020 | He | G05D 1/0246 |
| 2021/0078575 | A1* | 3/2021 | Machida | B60W 50/14 |

* cited by examiner

SPEED DIFFERENCE INDICATOR ON HEAD UP DISPLAY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to head up display systems of vehicles and more particularly to displaying visual indicators of speed differences via head up display systems of vehicles.

A driver of a vehicle traditionally views surroundings of a vehicle through windows, wind shields, and other glass of the vehicle. The driver may control vehicle acceleration, deceleration, and steering based on the driver's visual observation of the surroundings of the vehicle.

A vehicle may include one or more displays that display various information. For example, some vehicles include an infotainment system that includes a display that displays various infotainment and other vehicle information. A vehicle may also include a head up display (HUD) that displays information on a windshield of the vehicle. For example, the HUD may display a vehicle speed and other vehicle information.

SUMMARY

In a feature, a head up display (HUD) system includes: a difference module configured to determine a speed difference based on a difference between (a) a present speed of a vehicle and (b) a target speed of the vehicle; a light source configured to, via a windshield of the vehicle, generate a virtual display that is visible within a passenger cabin of the vehicle; and a display control module configured to control the light source to include a visual indicator of the speed difference in the virtual display.

In further features, the difference module is configured to set the speed difference based on the present speed of the vehicle minus the target speed of the vehicle.

In further features, a target module is configured to set the target speed of the vehicle based on a cruise control speed.

In further features, a target module is configured to set the target speed of the vehicle based on a speed limit of a road at a location of the vehicle.

In further features, a target module is configured to set the target speed of the vehicle based on a speed determined based on fuel efficiency of the vehicle.

In further features, a target module is configured to set the target speed of the vehicle based on weather at a location of the vehicle.

In further features, a target module is configured to set the target speed of the vehicle based on a road condition at a location of the vehicle.

In further features, a target module is configured to set the target speed of the vehicle based on an estimated time of arrival of the vehicle to a destination location.

In further features, a target module is configured to set the target speed of the vehicle based on a speed for a curve in a road.

In further features, the display control module is configured to adjust at least one attribute of the visual indicator as the speed difference changes.

In further features, the display control module is configured to adjust a length of the visual indicator as the speed difference changes.

In further features, the display control module is configured to: increase a length of the visual indicator as a magnitude of the speed difference increases; and decrease the length of the visual indicator as the magnitude of the speed difference decreases.

In further features, the display control module is configured to: display the visual indicator in a first position relative to a reference when the speed difference is positive; and display the visual indicator in a second position relative to the reference when the speed difference is negative, where the first position is different than the second position.

In further features, the display control module is configured to: display the visual indicator in a first color when the speed difference is positive; and display the visual indicator in a second color when the speed difference is negative, where the first color is different than the second color.

In further features, the display control module is configured to: decrease a transparency of the visual indicator as a magnitude of the speed difference increases; and increase the transparency of the visual indicator as the magnitude of the speed difference decreases.

In further features, the display control module is configured to: increase a frequency of waves in the visual indicator as a magnitude of the speed difference increases; and decrease the frequency of the waves in the visual indicator as the magnitude of the speed difference decreases.

In further features, the visual indicator includes a magnitude of the speed difference and an indicator of whether the speed difference is positive or negative.

In further features, a perception module is configured to identify boundaries of a present lane of the vehicle, where the display control module is configured to control the light source such that the visual indicator is visible within the boundaries of the present lane when viewed from a driver's seat.

In further features: an eye location module is configured to determine a location of eyes of a driver of the vehicle, where the display control module is configured to move the visual indicator based on the location of the eyes of the driver; and a disabling module is configured to selectively disable the display of the visual indicator when a gaze the driver is not toward a road in front of the vehicle.

In further features, a target module is configured to set the target speed of the vehicle based on at least two of: a cruise control speed; a speed limit of a road at a location of the vehicle; a speed determined based on efficiency of the vehicle; weather at a location of the vehicle; a road condition at a location of the vehicle; an estimated time of arrival of the vehicle to a destination location; and a speed for a curve in a road.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include a head up display (HUD) that displays a virtual image via a windshield of the vehicle. A light source may project the virtual image onto a reflector, and the reflector may reflect the virtual image onto the windshield. Alternatively, the light source may project the virtual image directly onto the windshield.

Maintaining a target speed by a driver of a vehicle may involve the driver monitoring the present speed of the vehicle and adjusting torque output from an engine and/or one or more electric motors. Even while using cruise control (e.g., adaptive cruise control), a driver may remain behind a vehicle that is traveling slower than the target speed for a period of time before the driver realizes that the vehicle is traveling slower than the target speed. Target speeds may also change quickly, such as when speed limits change.

The present application involves the HUD system including a visual indicator of a speed difference between a present vehicle speed and a target vehicle speed. The target vehicle speed may be adjusted, for example, based on speed limit, user input, road conditions, weather conditions, traffic conditions, achieving a target time of arrival to a destination location, and/or one or more other conditions. The visual indicator of the speed difference from the HUD system may help the driver more easily maintain the target speed as best possible and not travel too fast or too slow.

Figure 1:
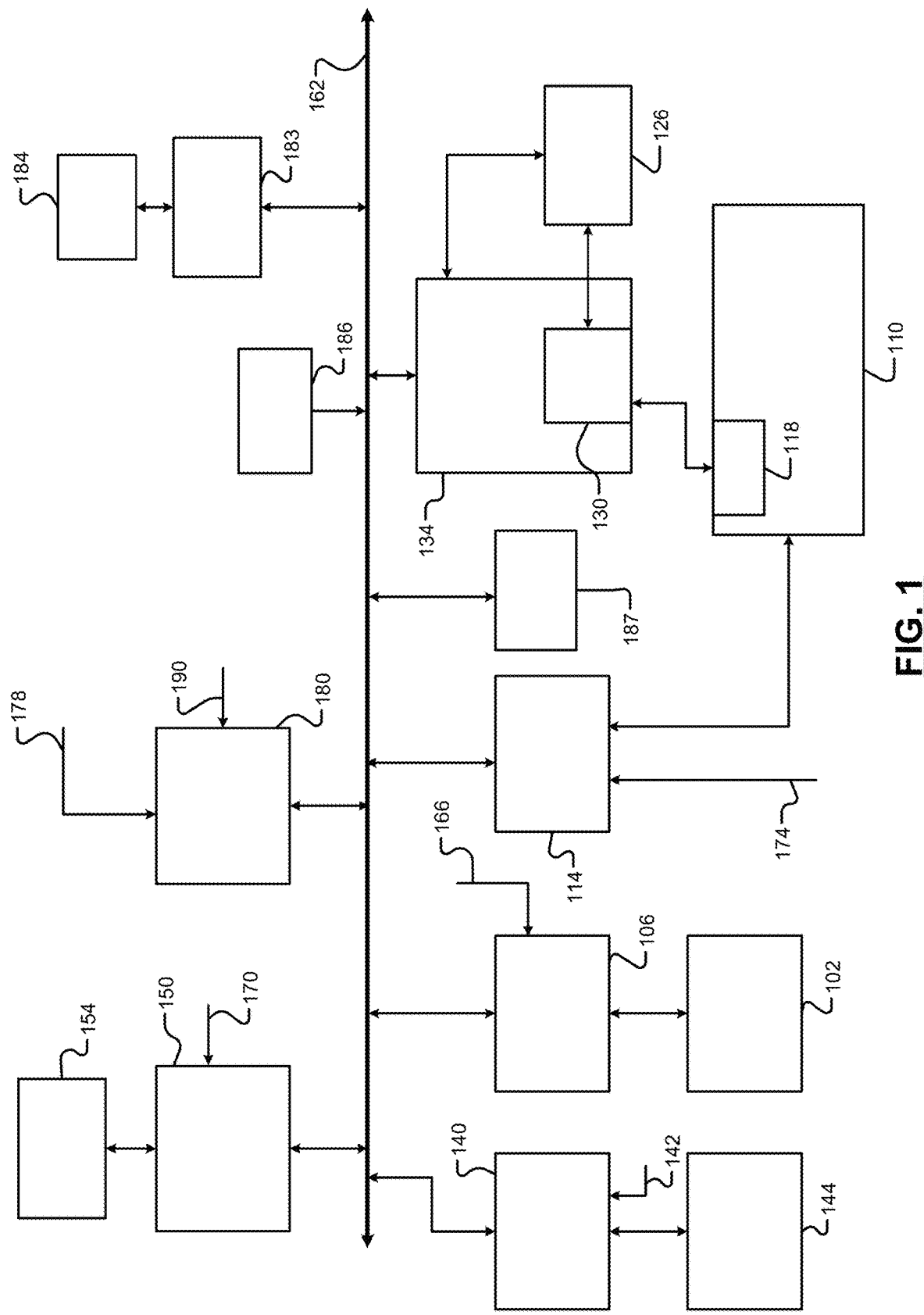
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators based on one or more driver inputs. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor. Also, one or more electric motors may be implemented without the transmission 110.

A power inverter module (PIM) 134 may control the electric motor 118 and the PCD 130, such as based on one or more driver inputs. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system. An electronic brake control module (EBCM) 150 may selectively control (e.g., friction) brakes 154 of the vehicle based on one or more driver inputs, such as a brake pedal position (BPP) 170.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. Propulsion torque generation (e.g., by the engine 102 and/or the electric motor 118) may be controlled based on the driver input. The BPP 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

Wheel speeds 190 measured by wheel speed sensors, respectively, may be input to the BCM 180 in various implementations. Each wheel speed sensor measures a rotational speed of one of the wheels. A vehicle speed module (e.g., in the TCM 114), may determine a speed of the vehicle (vehicle speed) based on one or more of the wheel speeds 190. For example only, the vehicle speed module may set the vehicle speed based on or equal to an average of all of the wheel speeds 190 or an average of the wheel speeds 190 of driven wheels of the vehicle. Driven wheels may be wheels that can transfer torque between the ground and one or more torque producing devices (e.g., the engine 102 and/or the electric motor 118).

An infotainment module 183 may output various information via one or more output devices 184. The output devices 184 may include, for example, one or more displays, one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

As another example, based on input from the external sensors and cameras 186, a perception module 187 perceives objects around the vehicle and locations of the objects relative to the vehicle. The ECM 106 may adjust torque output of the engine 102 based on input from the perception module 187. Additionally or alternatively, the PIM 134 may control power flow to and/or from the electric motor 118 based on input from the perception module 187. Additionally or alternatively, the EBCM 150 may adjust braking based on input from the perception module 187. Additionally or alternatively, the steering control module 140 may adjust steering based on input from the perception module 187. For example, one or more actions may be taken to avoid a perceived object.

The vehicle may include one or more additional control modules that are not shown, such as a chassis control module, a battery pack control module, etc. The vehicle may omit one or more of the control modules shown and discussed.

Figure 2:
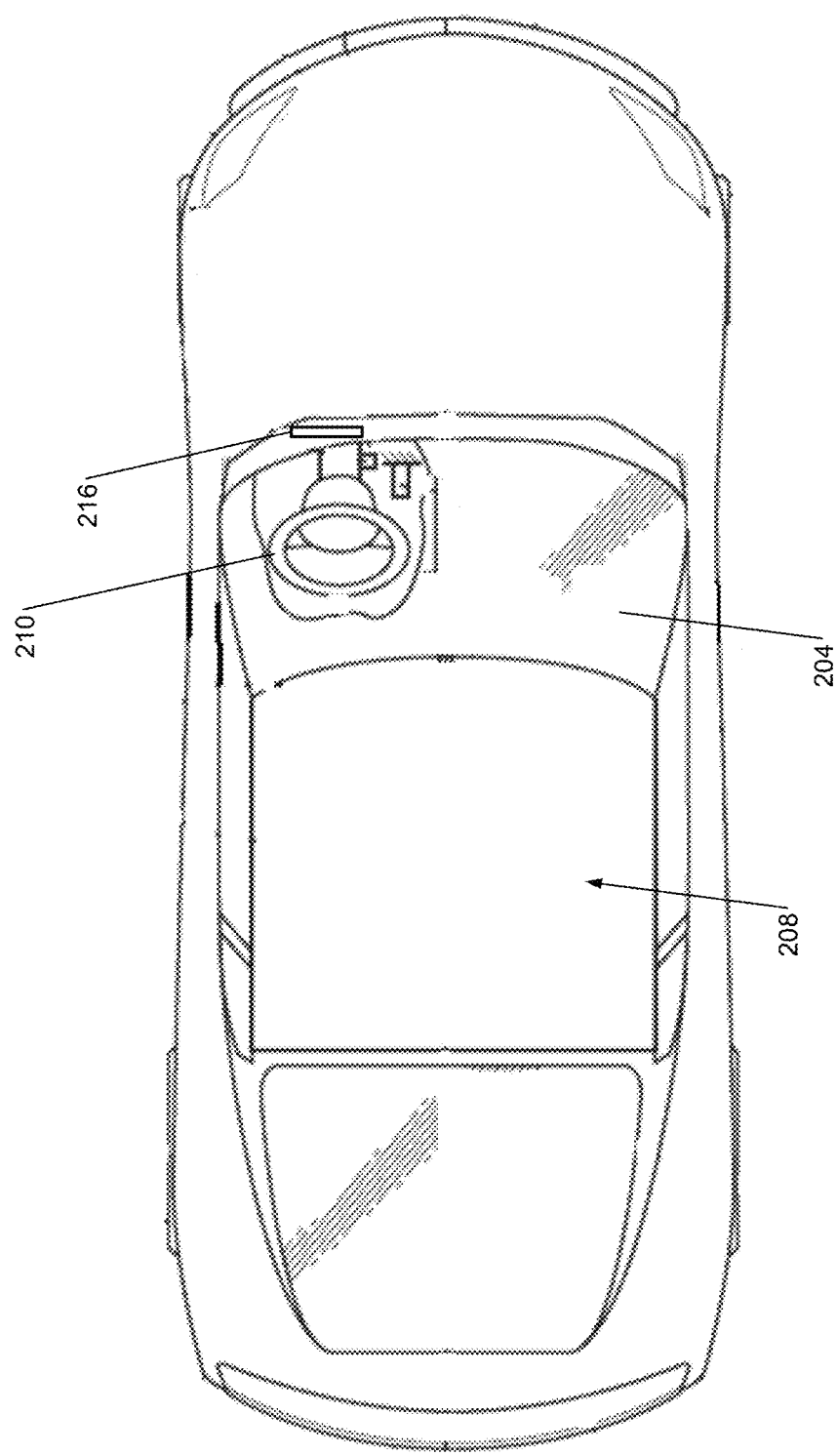
FIG. 2 is an overhead view of an example vehicle.
Figure 3:
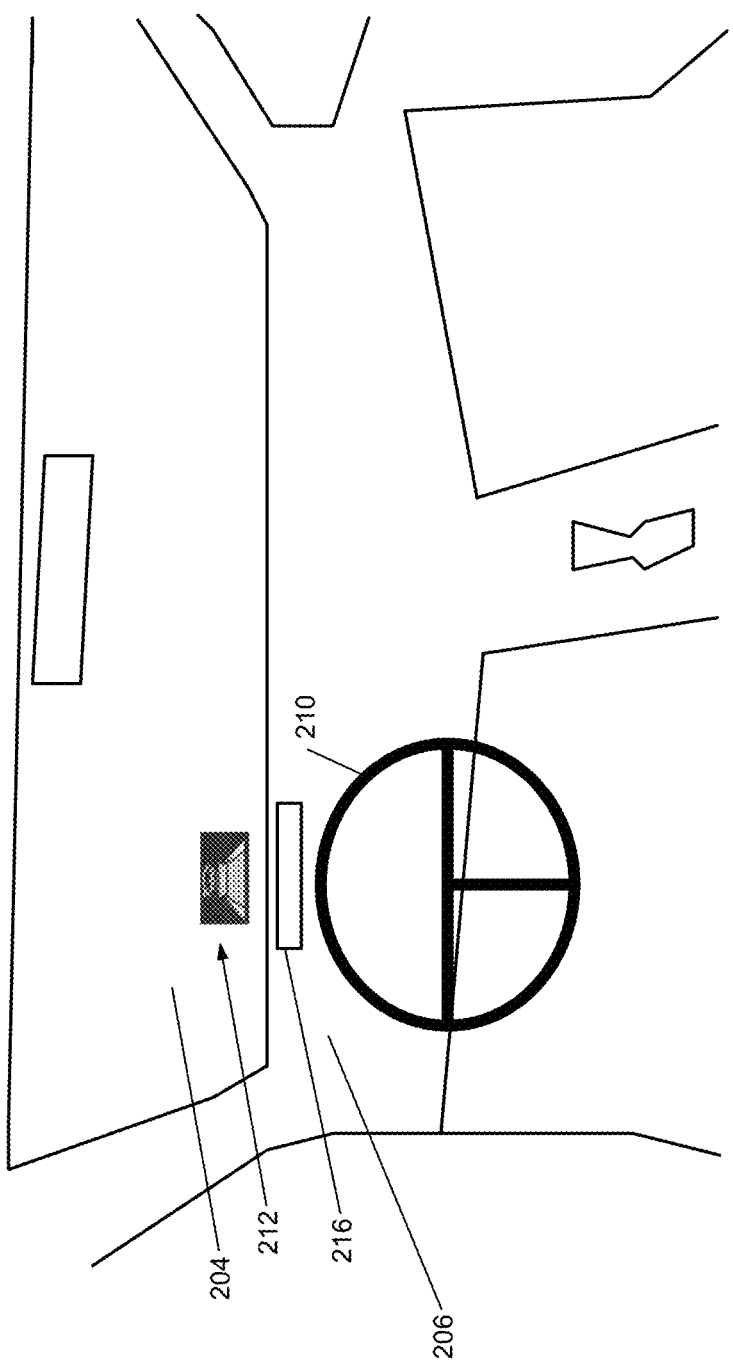
FIG. 3 is an example perspective view from of a driver seat within a passenger cabin of a vehicle.

FIG. 2 is an overhead (top) view of an example vehicle. FIG. 3 includes an example perspective view from a driver seat of a vehicle. The vehicle includes a windshield 204 located in a front opening of the vehicle. Passengers within a passenger cabin 208 of the vehicle can look through the windshield 204 to see in front of the vehicle.

As shown in FIG. 3, the windshield 204 is visually located above a dashboard 206 of the vehicle. The driver may turn a steering wheel 210 within the passenger cabin 208 to turn and steer the vehicle, such as to change lanes, merge, and park the vehicle. The vehicle may be an autonomous vehicle, a semi-autonomous vehicle, or a non-autonomous vehicle. In various implementations, the steering wheel 210 may be stowable or omitted.

A head up display (HUD) system 400 (see FIG. 4) projects information 212 (e.g., a virtual image) onto a portion of the windshield 204 through one or more apertures, such as aperture 216, in the dashboard 206. While an example size of the information 212 is provided, the information 212 may be presented on a larger or smaller area. Examples of the information 212 includes various vehicle information, such as a present vehicle speed, a present gear of a transmission of the vehicle, an engine speed, a directional heading of the vehicle, present infotainment system settings, and/or other vehicle information. The HUD system 400 presents information to the driver of the vehicle without the driver having to look away from objects in front of the vehicle. Another example of the information 212 includes a visual indication of a difference between the present vehicle speed and a target vehicle speed, as discussed further below.

Figure 4:
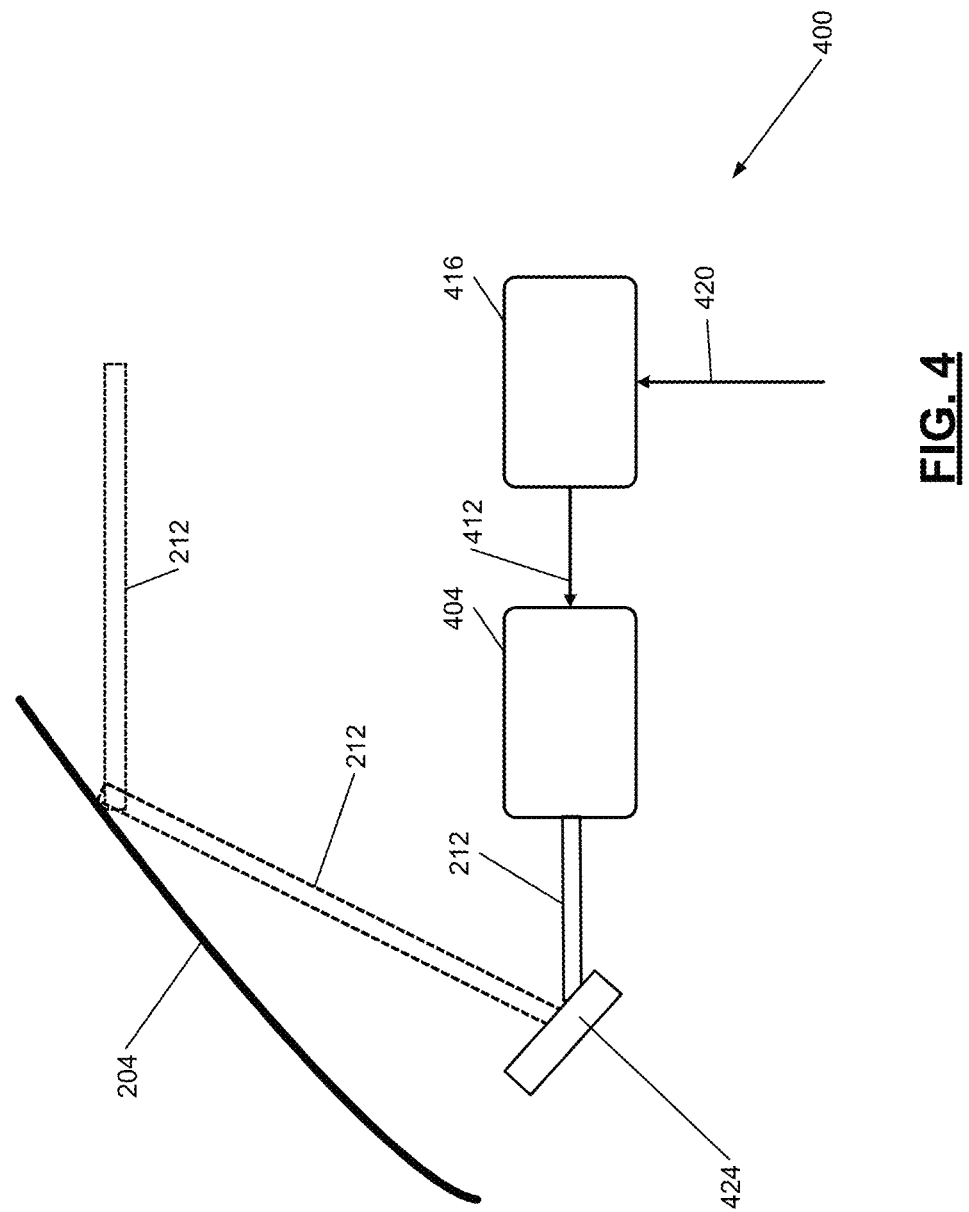
FIG. 4 includes a functional block diagram of an example implementation of a head up display (HUD) system.

FIG. 4 includes an example implementation of the HUD system 400. A light source 404 outputs (projects) light (e.g., of a virtual image) for display on the windshield 204 based on signals 412 from a HUD control module 416. For example only, the light source 404 may include one or more lasers and output red, green, and blue light. The HUD control module 416 generates the signals 412 based on vehicle data 420, such as described below.

The HUD control module 416 may obtain the vehicle data 420, for example, from the network 162. The vehicle data 420 may include, for example, the present speed of the vehicle, a target speed of the vehicle, the present gear of the transmission of the vehicle, the present engine speed, the present directional heading of the vehicle, the present infotainment system settings, and/or the other vehicle information.

A reflector 424 may reflect the output of the light source 404 onto the windshield 204 through the aperture 216. A viewer (e.g., the driver) can view the information 212 in the area where the information 212 is projected onto the windshield 204. In various implementations, the reflector 424 may be omitted, and the light source 404 may project the information 212 directly onto the windshield 204.

Figure 5:
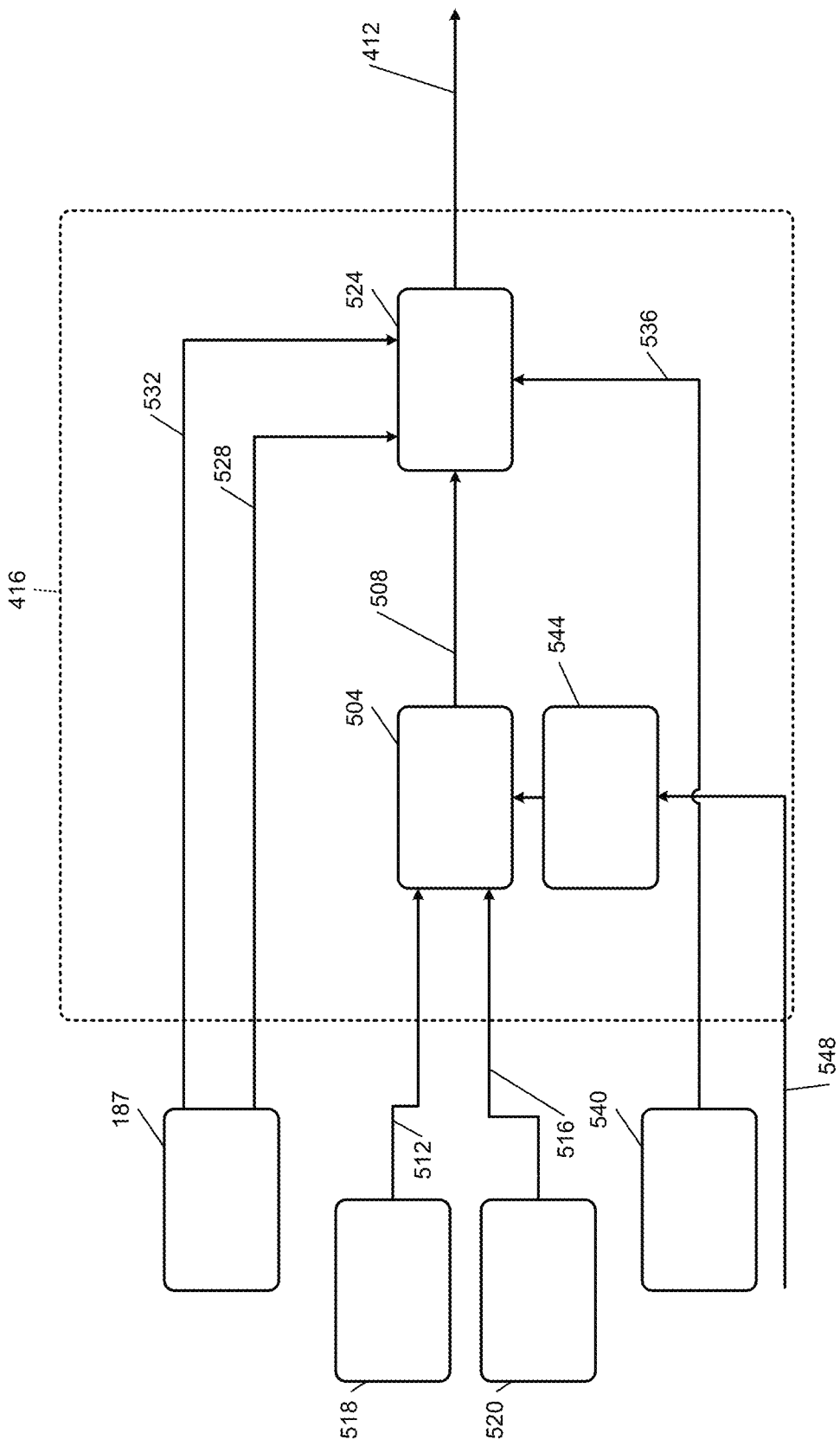
FIG. 5 is a functional block diagram of an example HUD control system.

FIG. 5 is a functional block diagram of an example HUD control system. A difference module 504 determines a speed difference 508 based on the present vehicle speed 512 and a target vehicle speed 516. For example, the difference module 504 may set the speed difference 508 based on or equal to the vehicle speed 512 minus the target vehicle speed 516. In this manner, the speed difference 508 will be negative when the vehicle speed 512 is less than the target vehicle speed 516 and positive when the vehicle speed 512 is greater than the target vehicle speed 516. The vehicle speed 512 may be determined based on one or more of the wheel speeds 190, such as described above. For example, a vehicle speed module 518 may set the vehicle speed 512 based on or equal to an average of two or more of the wheel speeds 190, such as the wheel speeds 190 of driven wheels of the vehicle.

A target module 520 may set the target speed 516. For example, the target module 520 may set the target speed 516 to a cruise control speed, such as a speed set in response to user input to a cruise control system or an adaptive cruise control speed set to maintain at least a predetermined distance between the vehicle and a vehicle in front of the vehicle.

In various implementations, the target module 520 may set the target speed 516 based on a most fuel/energy efficient speed under the present operating conditions. In various implementations, the target module 520 may set the target speed 516 to a speed for negotiating a curve or a road condition. The target module 520 may read the speed for negotiating a curve or road condition, for example, from one or more images captured using a camera (e.g., a forward facing camera) of the external sensors and cameras 186. Reading may include reading text in an image, such as using optical character recognition (OCR).

In various implementations, the target module 520 may set the target speed 516 to a speed limit at the location of the vehicle. The target module 520 may read the speed limit from one or more images captured using a camera (e.g., a forward facing camera) of the external sensors and cameras 186. Additionally or alternatively, the target module 520 may determine the speed limit at the location based on a location and a heading of the vehicle, such as measured using a global positioning system (GPS). The target module 520 may set the target speed 516 to the speed limit or an amount above or below the speed limit. The amount may be set in response to user input and may be adjustable by the target module 520, such as in response to user input.

In various implementations, the target module 520 may set the target speed 516 based on reaching an estimated time of arrival to a destination location. The estimated time of arrival and/or the destination location may be received via user input. In various implementations, the target module 520 may set the target speed 516 based on one or more present road and/or weather conditions. For example, the target module 520 may decrease the target speed 516 relative to a speed limit at the location of the vehicle when weather data indicates that snow is falling at the location of the vehicle. The target module 520 may obtain the weather data, for example, based on the location and the heading of the vehicle, such as measured using the GPS. Examples of road conditions include, for example, traffic within a predetermined distance in front of the vehicle, whether construction is present within a predetermined distance in front of the vehicle, whether one or more emergency vehicles are present within a predetermined distance in front of the vehicle, and other road conditions.

In various implementations, the target module 520 may set the target speed 516 based on two or more of the above speeds. For example, the target module 520 may initialize the target speed 516 to the speed limit (including plus or minus the amount). The target module 520 may adjust the target speed 516, such as to an average of the two, when the speed limit is different than a more fuel/energy efficient speed. The target module 520 may decrease the target speed 516 to such as the speed for negotiating a curve.

In various implementations, the target module 520 may set the target speed 516 to the present speed of the vehicle immediately in front of the vehicle. The present speed of the vehicle may be received from the other vehicle or infrastructure, such as using vehicle to vehicle (V2V) or vehicle to infrastructure (V2I) communication or determined, such as based on images captured using a camera (e.g., a forward facing camera) of the external sensors and cameras 186. In such implementations, the speed difference 508 corresponds to a difference between the vehicle speed 512 and the speed of the vehicle immediately in front of the vehicle (e.g., a lead vehicle).

The target module 520 may update the target speed 516 during vehicle operation based on one or more situational, environmental, and/or contextual conditions. The target module 520 may set the target speed 516 to one of the above speeds or a compromise between two or more of the above speeds, such as using arbitration. For example, the target module 520 may initialize the target speed 516 to the speed limit at the location of the vehicle. The target module 520 may adjust the target speed 516 to plus or minus the speed limit by an amount. The target module 520 may set the amount and the polarity based on user input. If the speed limit is different than the most fuel/energy efficient speed (e.g., when charge of the battery 126 is low), the target module 520 may set the target speed 516 based on the speed limit and the most fuel/energy efficient speed (e.g., an average of the two). When approaching a curve (e.g., when one or more passengers are in the vehicle and the vehicle is not in a sport or track mode), the target module 520 may decrease the target speed 516 (e.g., relative to the speed limit). The target module 520 may decrease the target speed 516, for example, to a speed for negotiating the curve. This may promote slowing the vehicle down. Weather and/or road conditions (e.g., snow, rain, ice) may be used to decrease the target speed 516 to below the speed limit. Estimated time of arrival may additionally or alternatively be used to increase and decrease the target speed 516 as necessary. As such, the target module 520 may set the target speed 516 based on one or more of the speeds above, average or prioritize one or more of the speeds above, and set the target speed 516 based on driver preferences, driving context, current vehicle status, and/or road/traffic/weather conditions either at the present location, in route, or at the trip destination.

A display control module 524 controls the light source 404 to control the information 212 displayed. Particularly, the display control module 524 controls the light source 404 to display a visual indicator of the speed difference 508 via the HUD system 400. The display control module 524 may display the visual indicator of the speed difference 508 between boundaries 528 of a present lane within which the vehicle is located. The perception module 187 may identify the boundaries 528 using images from one or more cameras of the external sensors and cameras 186, such as one or more forward facing cameras.

In various implementations, the display control module 524 may display the visual indicator of the speed difference 508 behind a vehicle (or other object) 532 located directly in front of the vehicle as to not have the visual indicator overlapping the vehicle in front of the vehicle. The perception module 187 may identify locations of the vehicle (or other object) 532 using images from one or more cameras of the external sensors and cameras 186, such as one or more forward facing cameras.

In various implementations, the display control module 524 may adjust a location of the visual indicator of the speed difference 508 based on a present eye location (e.g., view) 536 of eyes of the driver. For example, the display control module 524 may display the visual indicator of the speed difference 508 vertically upward when the eye location 536 of the driver moves vertically upward and vice versa. Additionally or alternatively, the display control module 524 may display the visual indicator of the speed difference 508 horizontally leftward when the eye location 536 of the driver moves horizontally leftward and vice versa.

An eye location module 540 may track eye position of the driver and determine the eye location 536 based on the position of the eyes of the driver. The eye location module 540 may track the location of the eyes (e.g., pupils) of the driver, for example, using a camera facing the driver seat and configured to capture images including eyes of the driver.

In various implementations, a disabling module 544 may selectively enable and disable the display of the visual indicator of the speed difference 508 based on a gaze 548 of the driver. For example, the disabling module 544 may disable the display of the visual indicator of the speed difference 508 when the gaze 548 is away from the road for at least a predetermined period (e.g., during autonomous or semiautonomous driving). This may prevent the visual indicator of the speed difference 508 from being a distraction to the driver. The disabling module 544 may enable the display of the visual indicator of the speed difference 508 when the gaze 548 is toward the road in front of the vehicle. For example, the disabling module 544 may disable the difference module 504 to disable the display of the visual indicator. Alternatively, the disabling module 544 may disable the display control module 524. A gaze module (e.g., of the eye location module 540) may determine the gaze 548 based, for example, using a camera facing the driver seat and configured to capture images including a face of the driver.

Figure 6:
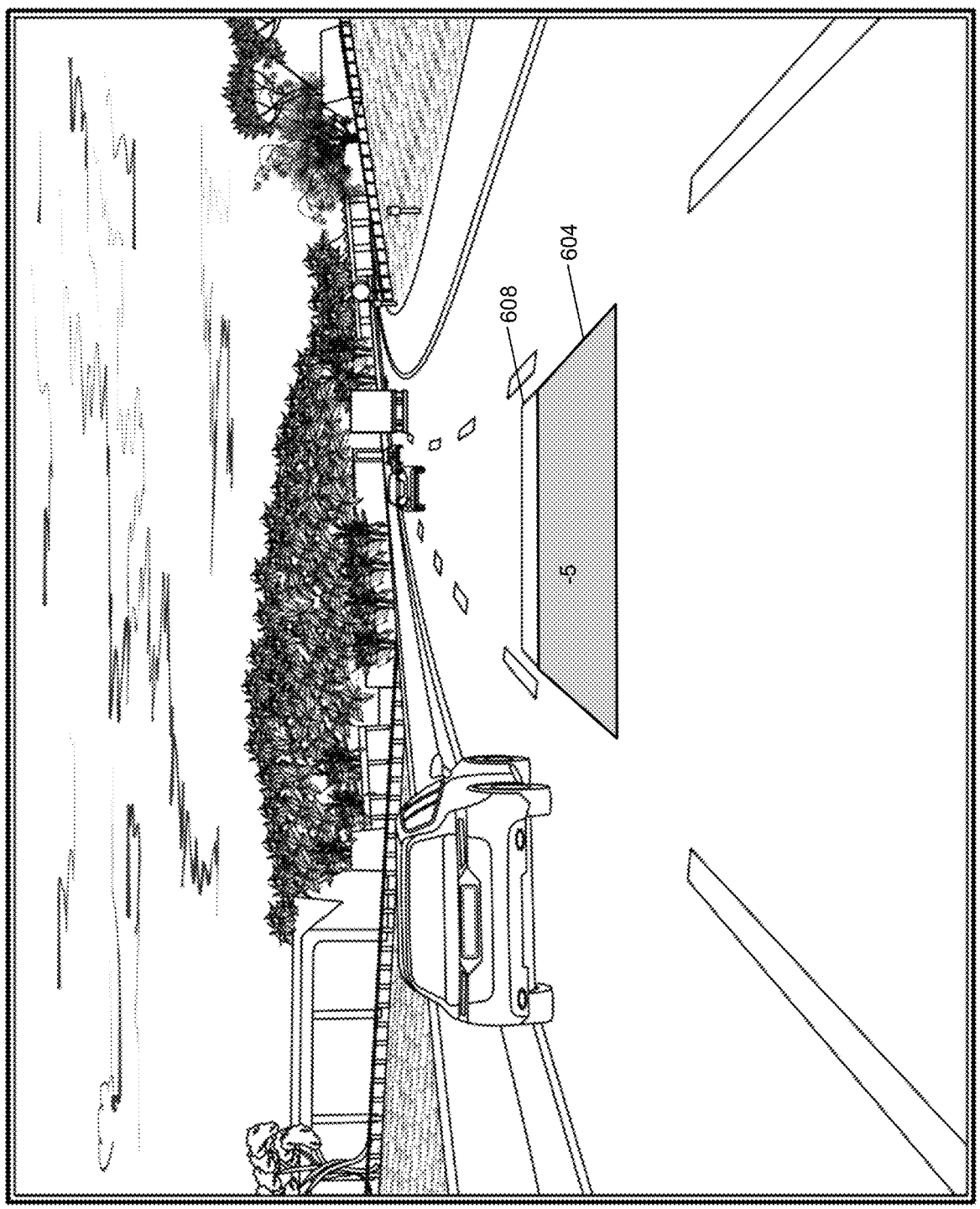
FIGS. 6-8 include example illustrations of HUD displays including visual indicators of speed differences.
Figure 7:
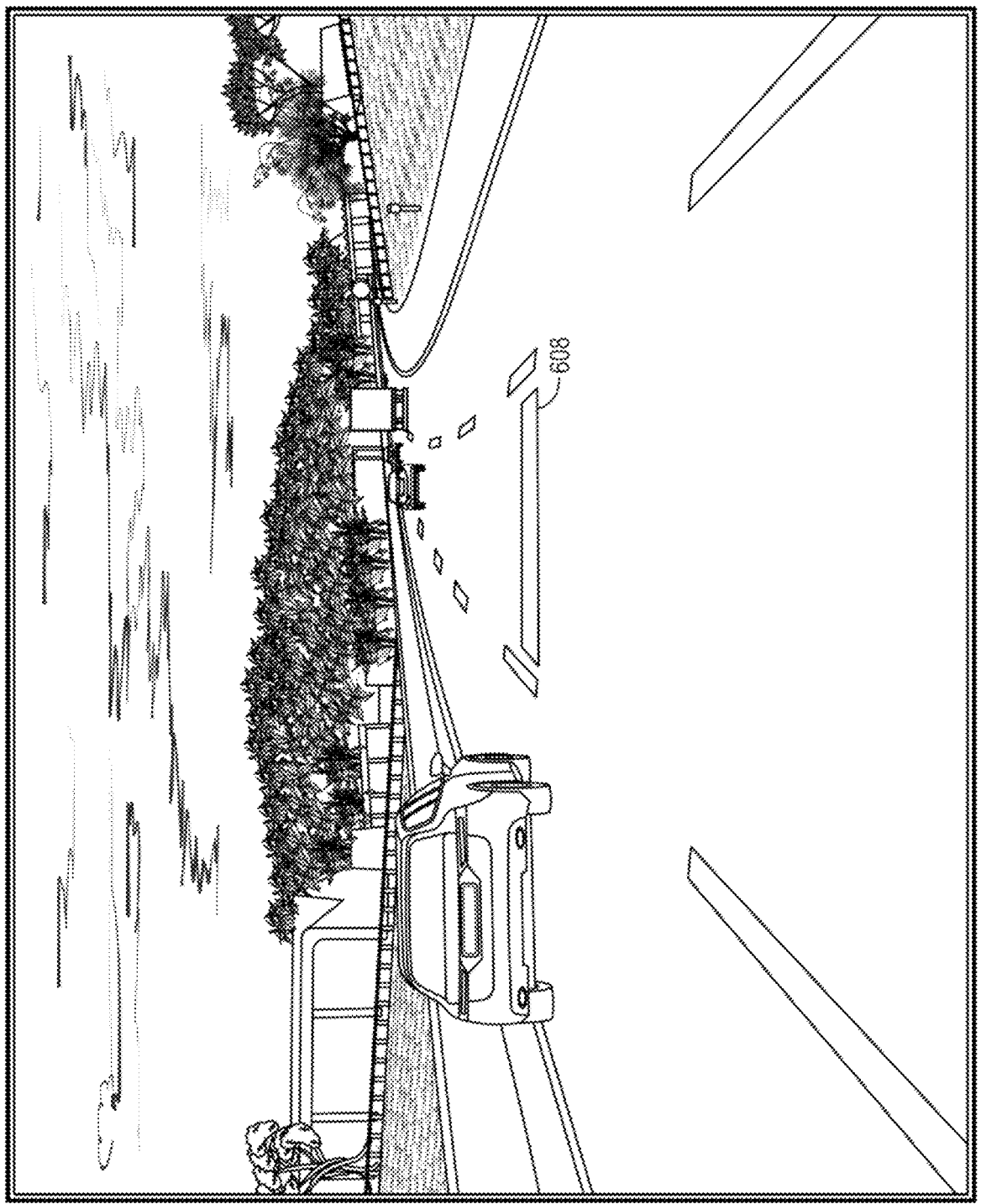
Figure 8:
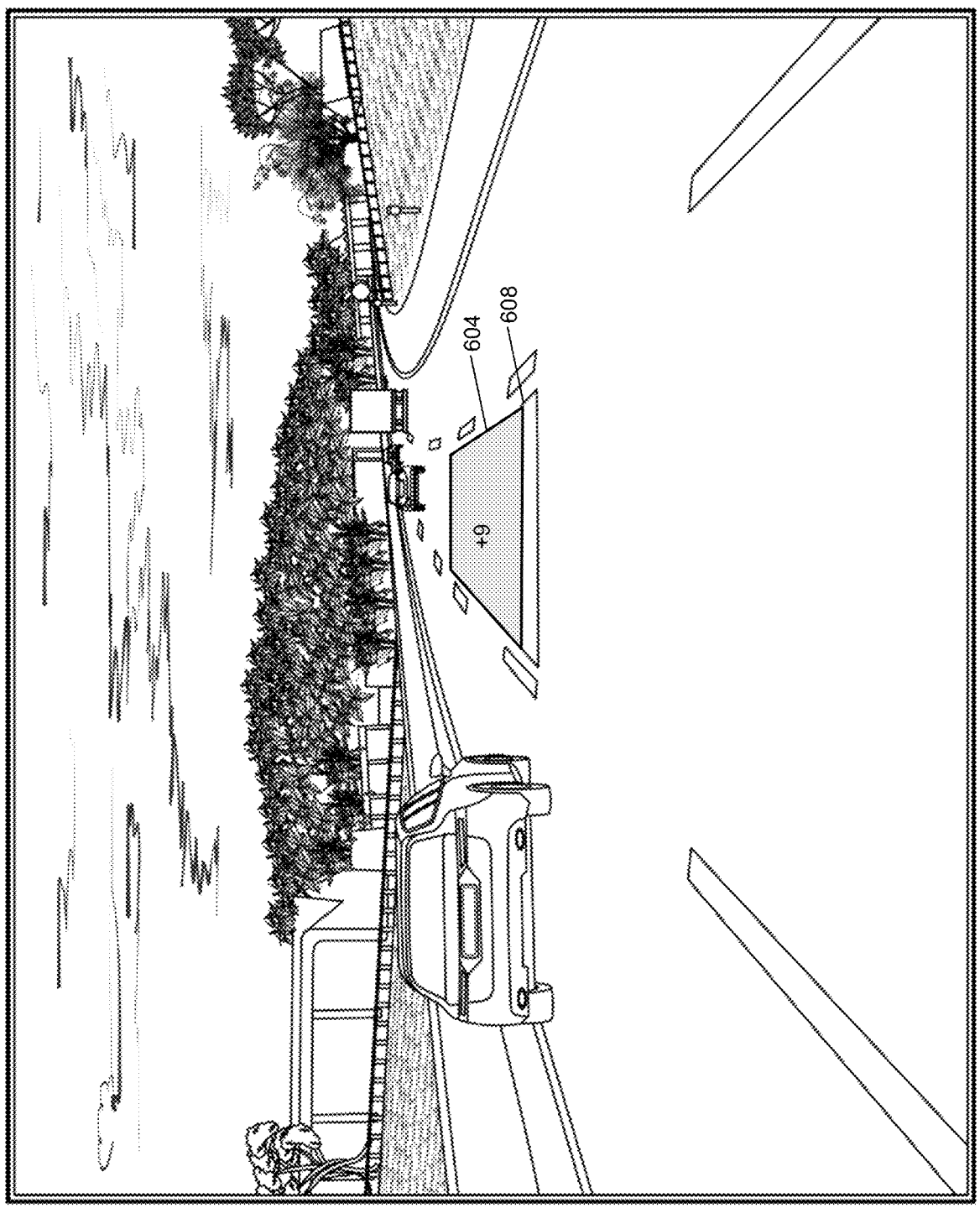

FIGS. 6-8 include example images from within a passenger cabin including a visual indicator 604 of the speed difference 508 generated by the display control module 524. The visual indicator 604 visually indicates the magnitude of the speed difference 508 and the polarity (positive or negative) of the speed difference 508. The visual indicator 604 may also include the magnitude and the polarity of the speed difference 508, which are −5 miles per hour another suitable unit of speed in the example of FIG. 6 and +9 miles per hour in the example of FIG. 8.

The display control module 524 may adjust one or more visual attributes of the visual indicator 604 based on at least one of (a) the magnitude of the speed difference 508; and (b) the polarity of the speed difference 508. For example, the display control module 524 may increase a dimension (e.g., vertical height) of the visual indicator 604 as the magnitude of the speed difference 508 increases. For example, the visual indicator 604 is illustrated as having a greater vertical length in FIG. 8. The display control module 524 may decrease a dimension (e.g., vertical height) of the visual indicator 604 as the magnitude of the speed difference 508 decreases.

The display control module 524 may display the visual indicator 604 in one color (e.g., green) when the polarity of the speed difference 508 is negative, and display the visual indicator in a second color (e.g., red) when the polarity of the speed difference 508 is positive. The display control module 524 may display the visual indicator 604 vertically below a reference 608 when the polarity is negative, such as illustrated in the example of FIG. 6. The display control module 524 may display the visual indicator 604 vertically above the reference 608 when the polarity is negative, such as illustrated in the example of FIG. 8.

When the magnitude of the speed difference 508 is zero (i.e., when the vehicle speed 512 is equal to the target speed 516), the display control module 524 may display only the reference 608. This may visually indicate that the vehicle speed 512 is equal to the target speed 516, such as shown in the example of FIG. 7.

While example attributes and features of the visual indicator 604 are provided, the present application is also applicable to other ways of generating the visual indicator 604. For example, the display control module 524 may generate the visual indicator 604 with waves and change a frequency of the waves based on the magnitude of the speed difference 508. For example, the display control module 524 may increase the frequency of the waves as the magnitude increases and vice versa. The display control module 524 may change a direction of the waves based on the polarity. For example, the display control module 524 may generate the waves to appear to be moving toward the vehicle when the polarity is negative and generate the waves to appear to be moving away from the vehicle when the polarity is positive.

As another example, the display control module 524 may adjust a saturation or transparency of the visual indicator 604 based on the magnitude of the speed difference 508. For example, the display control module 524 may decrease a transparency of the visual indicator 604 as the magnitude increases and vice versa. In this way, the visual indicator 604 will become less transparent as the magnitude of the speed difference 508 increases and will become more transparent as the magnitude of the speed difference 508 approaches zero. The visual indicator 604 may be made transparent when the speed difference 508 is equal to zero.

Figure 9:
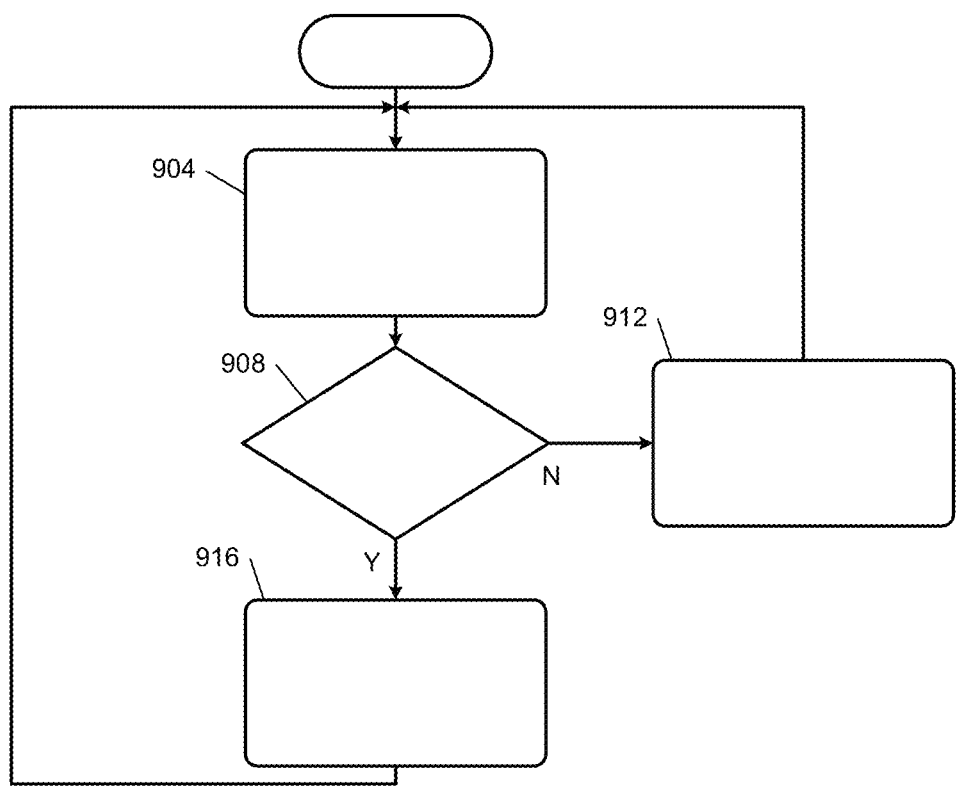
FIG. 9 is a flowchart depicting an example method of visually indicating a speed difference via the HUD system.

FIG. 9 is a flowchart depicting an example method of visually indicating the speed difference 508 via the HUD system 400. Control begins with 904 where the difference module 504 determines the speed difference 508 based on the (present) vehicle speed 512 and the target speed 516. The target module 520 sets the target speed 516, such as described above. The vehicle speed module 518 may determine the vehicle speed 512 based on one or more of the wheel speeds 190, such as described above.

At 908, the disabling module 544 may determine whether the gaze 548 of the driver is toward the road in front of the vehicle. If 908 is false, the disabling module 544 may disable the display of the visual indicator 604 via the HUD system 400 at 912, such as by disabling the difference module 504, the display control module 524, or both. If 908 is true, the disabling module 544 may enable the display of the visual indicator 604 via the HUD system 400 and control continues with 916.

At 916, the display control module 524 displays the visual indicator 604 of the speed difference 508 via the HUD system 400, such as described above. The display control module 524 may set one or more visual attributes of the visual indicator 604 based on at least one of (a) the magnitude of the speed difference 508 and (b) the polarity of the speed difference 508, such as described above. The display control module 524 may also display the magnitude and the polarity of the speed difference 508 via the HUD system 400.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A head up display (HUD) system, comprising:
   a difference module configured to determine a speed difference based on a difference between (a) a present speed of a vehicle and (b) a target speed of the vehicle;
   a light source configured to, via a windshield of the vehicle, generate a virtual display that is visible within a passenger cabin of the vehicle;
   a perception module configured to identify boundaries of a present lane of the vehicle, the boundaries of the present lane decreasing in width from a point of view of a driver; and
   a display control module configured to:
      control the light source to include a visual indicator of the speed difference in the virtual display behind an object located directly in front of the vehicle such that the visual indicator of the speed difference does not overlap the object;
      increase a length of the visual indicator as a magnitude of the speed difference increases;
      decrease the length of the visual indicator as the magnitude of the speed difference decreases; and
      display the visual indicator between the boundaries of the present lane and such that a width of the visual indicator decreases from the point of view of the driver with the width of the boundaries of the present lane.

2. The HUD system of claim 1 wherein the difference module is configured to set the speed difference based on the present speed of the vehicle minus the target speed of the vehicle.

3. The HUD system of claim 1 further comprising a target module configured to set the target speed of the vehicle based on a cruise control speed.

4. The HUD system of claim 1 further comprising a target module configured to set the target speed of the vehicle based on a speed limit of a road at a location of the vehicle.

5. The HUD system of claim 1 further comprising a target module configured to set the target speed of the vehicle based on a speed determined based on fuel efficiency of the vehicle.

6. The HUD system of claim 1 further comprising a target module configured to set the target speed of the vehicle based on weather at a location of the vehicle.

7. The HUD system of claim 1 further comprising a target module configured to set the target speed of the vehicle based on a road condition at a location of the vehicle.

8. The HUD system of claim 1 further comprising a target module configured to set the target speed of the vehicle based on an estimated time of arrival of the vehicle to a destination location.

9. The HUD system of claim 1 further comprising a target module configured to set the target speed of the vehicle based on a speed for a curve in a road.

10. The HUD system of claim 1 wherein the display control module is configured to adjust at least one attribute of the visual indicator as the speed difference changes.

11. The HUD system of claim 10 wherein the display control module is configured to:
further display a reference;
display the reference in a first position further from the vehicle than the reference when the speed difference is positive; and
display the reference in a second position closer to the vehicle than the reference when the speed difference is negative,
wherein the first position is different than the second position.

12. The HUD system of claim 10 wherein the display control module is configured to:
display the visual indicator in a first color when the speed difference is positive; and
display the visual indicator in a second color when the speed difference is negative,
wherein the first color is different than the second color.

13. The HUD system of claim 10 wherein the display control module is configured to:
decrease a transparency of the visual indicator as a magnitude of the speed difference increases; and
increase the transparency of the visual indicator as the magnitude of the speed difference decreases.

14. The HUD system of claim 1 wherein the visual indicator includes a magnitude of the speed difference and an indicator of whether the speed difference is positive or negative.

15. The HUD system of claim 1 further comprising:
an eye location module configured to determine a location of eyes of the driver of the vehicle,
wherein the display control module is configured to move the visual indicator based on the location of the eyes of the driver; and
a disabling module configured to selectively disable the display of the visual indicator when a gaze the driver is not toward a road in front of the vehicle.

16. The HUD system of claim 1 further comprising a target module configured to set the target speed of the vehicle based on at least two of:
a cruise control speed;
a speed limit of a road at a location of the vehicle;
a speed determined based on efficiency of the vehicle;
weather at a location of the vehicle;
a road condition at a location of the vehicle;
an estimated time of arrival of the vehicle to a destination location; and
a speed for a curve in a road.

17. A head up display (HUD) method, comprising:
determining a speed difference based on a difference between (a) a present speed of a vehicle and (b) a target speed of the vehicle;
via a windshield of the vehicle, by a light source, generating a virtual display that is visible within a passenger cabin of the vehicle;
identifying boundaries of a present lane of the vehicle, the boundaries of the lane decreasing in width from a point of view of a driver;
controlling the light source to include a visual indicator of the speed difference in the virtual display behind an object located directly in front of the vehicle such that the visual indicator of the speed difference does not overlap the object;
increasing a length of the visual indicator as a magnitude of the speed difference increases;
decreasing the length of the visual indicator as the magnitude of the speed difference decreases; and
displaying the visual indicator between the boundaries of the present lane and such that a width of the visual indicator decreases from the point of view of the driver with the width of the boundaries of the present lane.

* * * * *